Sept. 1, 1942.  W. P. LEAR  2,294,786
MOTOR POSITIONING SYSTEM
Filed March 9, 1940
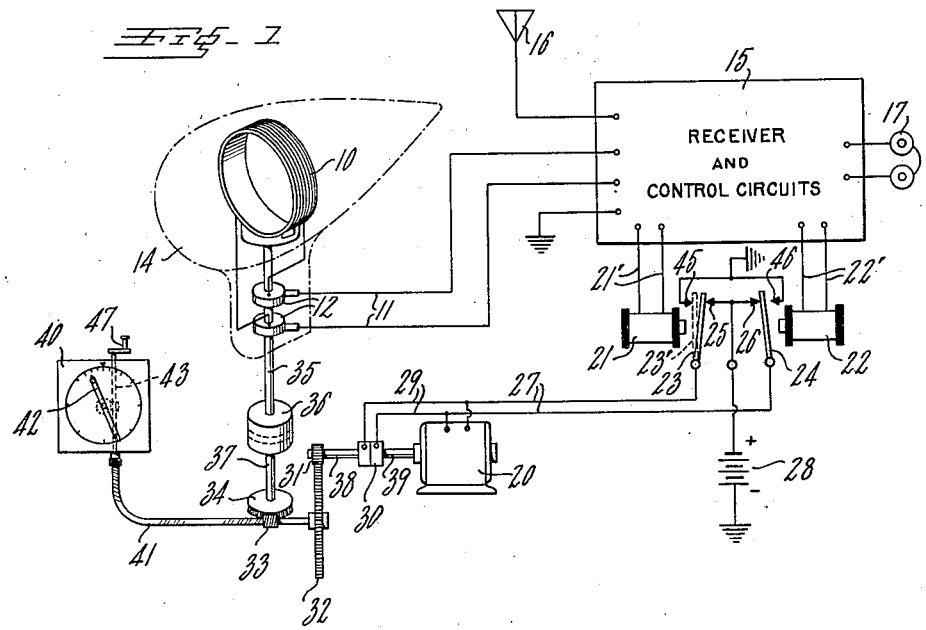
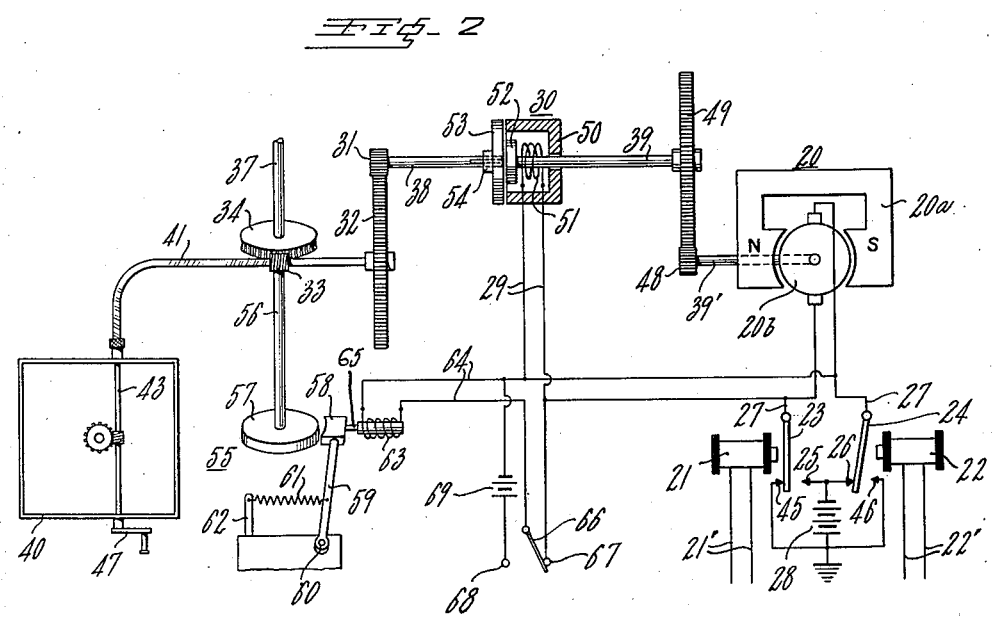
INVENTOR.
WILLIAM P. LEAR
BY
Richard A. Marsen
ATTORNEY Patented Sept. 1, 1942

2,294,786

UNITED STATES PATENT OFFICE 2,294,786

MOTOR POSITIONING SYSTEM

William P. Lear, Dayton, Ohio, assignor, by mesne assignments, to Lear Avia, Inc., Piqua, Ohio, a corporation of Illinois Application March 9, 1940, Serial No. 323,106

3 Claims. (Cl. 192—.02)

This invention relates to remote positioning systems and more particularly relates to novel arrangements for angularly positioning a motor driven member within small angular tolerances.

In the remote positioning of a member, it is desirable in many applications to change its position at a steady rate of speed, and then abruptly arrest its motion at a desired new position. In prior devices, difficulty was encountered in practice due to overshooting of a motor driven member with respect to a desired position, due to rotational inertia of the moving parts. Another difficulty was hunting, wherein initial overshooting of the driven member sets reverse motivation forces into operation for returning it to the desired position, which reverse motivation in turn caused overshooting in the opposite direction to effect an unstable hunting condition.

In accordance with the present invention, I incorporate a rapidly disengageable clutch between an electric motor and the member to be driven, and provide circuit arrangements for disengaging the clutch substantially simultaneously with the deenergization of the motor in response to a signal impulse. The clutch abruptly disengages the driven member from the driving motor in response to the signal condition, disconnecting the driven member from rotational inertia of the motor rotor. The driven member is thus stopped at its desired new position without overshooting due to motor inertia. Furthermore, due to its deenergization, the motor soon ceases rotating and the system is again in condition for operation in response to another control signal. Another feature of my novel driving arrangement is the inclusion of reduction gearing between the clutch and the driven member to effect a predetermined rate of positioning thereof and to introduce additional frictional forces to inhibit any tendency of the driven member to overshoot upon abrupt clutch disengagement. Reenergization of the motor for new orientation of the driven member in response to an electrical signal also abruptly engages the clutch, effecting the normal rate of member driving to a new position. When the member is at the new position, prompt electrical disengagement of the motor and clutch therefrom thereupon insures its stable alignment at the new position.

In a modified form of my invention I provide braking means at the driven member arranged to be abruptly engageable upon disengagement of the clutch and driving motor. The brake is electromagnetically operated in direct circuit relation with the electromagnetic clutch and electric motor. The brake serves to further inhibit any possible tendency of the driven member to overshoot, and effectively locks it in the required new position upon suitable electrical actuation. The advantage of this arrangement lies in the fact that motivation of the driven member is effective at a predetermined normal rate until it substantially reaches its new position, whereupon the system is instantly responsive to a signal impulse to arrest it in the new position. In practice, the driven member may be positioned accurately within 1° of an arc with rotational operation of 180° per second or higher.

The present invention is a continuation-in-part of my copending application, Serial Number 286,733, entitled "Automatic radio direction indicator" filed on July 27, 1939, and assigned to the same assignee as is the present invention. In the copending case the invention is disclosed in connection with the operation of a rotatable loop antenna and associated bearing indicator of an automatic radio directional system. In this application of the invention, the loop antenna is motivated towards the null signal receiving position with respect to the radio transmitter and stopped in that position, and being immediately responsive to repositioning by the drive arrangement. Other applications of the invention are feasible as will be more evident from the detailed description thereof hereinafter.

It is accordingly an object of the present invention to provide novel motor driving arrangements for accurately positioning a driven member in response to a signal impulse.

Another object of the present invention is to provide a novel motor positioning arrangement incorporating a clutch abruptly actuatable with the motor circuit.

Still another object of the present invention is to provide a novel member positioning arrangement incorporating an electric motor and electric clutch in direct circuit relation, in combination with reduction gearing at the driven member.

A further object of the present invention is to provide a novel arrangement for positioning a member at a predetermined rate and for abruptly stopping the member in response to an electrical signal at any position in its angular course without overshooting or hunting.

Still a further object of the present invention is to provide a novel member positioning arrangement incorporating electromagnetic braking means in direct circuit relation with the driving motor and electromagnetic clutch.

These and further objects of the present invention will become more apparent in the following description thereof taken in connection with the drawing, in which:

Fig. 1 is a diagrammatic illustration of the invention as applied in an automatic radio direction finder system, and Fig. 2 is a diagrammatic representation of a modification of the invention incorporating an electromagnetic brake.

The automatic radio direction finder arrangement schematically shown in Fig. 1 corresponds to the system disclosed in detail in my copending application, Serial Number 286,733 hereinabove referred to. Essentially, this system comprises a rotatable directional or loop antenna 10 connected to a receiver circuit 15 through connection leads 11 and slip rings 12. A non-directional antenna 16 is also connected to receiver 15. Receiver 15 is arranged to translate the received radio signals into a control signal for operating the loop motor relays. The schematically indicated "Receiver and control circuits" unit 15, represents the corresponding component of the system disclosed in Seral Number 286,733, or an equivalent arrangement. Earphones 17 are connected to the receiver for aural perception of the received signals.

In the automatic direction finder, the rotatable loop antenna 10 is driven by motor 20 for its positioning at the null signal reception position with respect to the transmitted signals, whereupon the control signal to which motor 20 and its associated relays are responsive is eliminated and the loop antenna 10 stops and stays at the null position. The motor relay solenoids 21 and 22 are connected to the control circuits of receiver unit 15 by respective connections 21' and 22', and are selectively operated in accordance with the direction in which loop antenna 10 must be turned to reach the null signal position. The sense of the control signal derived by unit 15 selectively determines the operation of relay solenoid 21 or 22.

Respective relay armatures 23, 24 of solenoids 21, 22 are normally against their front contact positions 25, 26. In this normal position, both leads 27 to motor 20 are at the same potential, and the motor is in a deenergized condition. Motor 20 is a reversible one of any suitable type. A direct current reversible motor is illustrated, energizable by a battery source 28. The positive terminal of battery 28 is connected to the front contacts 25, 26 of relays 21, 22; and its negative terminal is connected to ground. Where an alternating current motor is used, an alternating current source is substituted for direct current source 28.

In accordance with my invention, the reversible motor is arranged to operate the driven member to be positioned through a rapidly actuable electromagnetic clutch. In Fig. 1, loop antenna 10 is the positionable member coupled to reversible motor 20 by electromagnetic clutch 30, reduction gearing 31, 32, worm gearing 33, 34, and shaft 35 through a quadrantal error compensator 36 and coupling shaft 37. Electromagnetic clutch 30 is shown in parallel connection with motor 20 through leads 29. The clutch is arranged to abruptly disengage driven shaft 38 from motor driving shaft 39 when the motor 20 is deenergized in response to a signal condition, and to abruptly reengage shafts 38 and 39 upon energization of the motor. Any suitable abruptly engageable and disengageable electromagnetic clutch may be used for this purpose such as for example the one shown in Fig. 10 of my application, Serial Number 286,733. The electromagnetic clutch 30 may be connected in series with the motor circuit, or be connected directly to the relay circuits, even with a separate source of energization if so desired. The important aspect of the motor and clutch arrangement and circuital relation in the present invention resides in the substantially simultaneous actuation of the motor and clutch in response to an electrical impulse to abruptly stop the driven member at its corresponding position. The particular circuit connections between the clutch, motor and operating relays may accordingly be variously arranged as will be understood by those skilled in the art.

The reduction spur gearing 31, 32 and reduction worm gearing 33, 34 are designed to operate the driven member, in this case loop antenna 10, at the required rate of change of angular orientation, to suitably reduce the operating speed of motor 20. A bearing indicator 40 is coupled to rotatable antenna 10 through a flexible cable 41 connected to worm 33. Pointer 42 of indicator 40 is arranged to correspond to the angular position of rotatable antenna 10 and thus point out the direction to the radio station transmitter tuned to when loop antenna 10 is in the null receiving position. Pointer 42 is driven by rod 43 within the indicator 40. Rod 43 is coupled to flexible cable 41. The gearing ratio between worm 43 and needle 42 is the same ration as between worm 33 and worm gear 34 of loop antenna 10. A quadrantal error corrector 36 is arranged between indicator 40 and loop antenna 10 to compensate for bearing inaccuracies which may be present due to local metallic objects about the loop antenna, so that the indications on indicator 40 are the correct azimuthal bearings.

When relay 21 is energized due to an off-null reception position of loop antenna 10 with respect to the radio transmitter, and the generation of a corresponding control signal by unit 15, the associated armature 23 is attracted away from front contact 25 to back contact 45, as shown at dotted line position 23'. Motor 20 is thereupon immediately energized by battery 28 through the following electrical circuit then completed: back contact 45, to ground and to negative terminal of battery 28, positive terminal of battery 28 to front contact 26 of relay 22, armature 24, and to motor 20 through connection leads 27, and back to front contact 45 to armature 23 at position 23'. Electromagnetic clutch 30 is thereupon also instantly energized and engaged to drive driven shaft 38 and loop 10 through its respective reduction gearings 31, 32 and 33, 34. Loop antenna 10 is rotated at the predetermined normal rate in a direction towards the null signal position. The normal rate of rotation of loop antenna 10 is determined by the normal speed of motor 20 and the ratio of gearing reduction. A suitable rate for automatic radio directional operation is about 60° per second. However, more rapid or slower rates may be employed.

When rotatable loop antenna 10 reaches the null signal position, the corresponding control signal generated by receiver unit 15 is eliminated so that the prior energized relay solenoid 21 is immediately deenergized, releasing its armature 23 to the neutral front contact 25 position. Motor 20 and clutch 30 are thereupon immediately deenergized, and driven shaft 38 is abruptly disconnected from motor drive shaft 39. Inertial rotation of the rotor of motor 20 would overdrive loop antenna 10 were it not for the abrupt disconnection thereof by the electromagnetic clutch 30. The rotation of loop antenna 10 is quickly arrested in this manner, the loop 10 remaining in the desired or null signal position without overshooting due to motor rotational inertia. Abrupt arresting of the loop antenna in the desired position is aided by the reduction gearing 31, 32 and 33, 34 between the loop 10 and driven shaft 38. The frictional forces of the gearing, as well as of the bearings of the loop antenna are generally sufficient to quickly stop the loop rotation within 1° of arc, giving a corresponding bearing accuracy of 1°.

A high overall reduction through gearing 31, 32 and 33, 34 minimizes possible overshooting of loop 10, since one revolution of the relatively high speed motor 20, produces only a fractional degree of angular rotation of the loop antenna 10. In a practical embodiment for example, the loop antenna 10 was operated at the rate of 60° of arc per minute; the normal speed of the motor 20 was 1500 revolutions per minute corresponding to 25 revolutions per second; and an overall reductional gearing ratio of 150:1 was applied through gears corresponding to 31, 32 and 33, 34 having respective 10:1 and 15:1 reduction ratios. In this case, one revolution of the motor caused about a one-half degree advance of the loop. Since the disconnection between the motor shaft 39 and driven shaft 38 by clutch 30 is substantially simultaneous with the electrical actuation of the control relays and effective in less than one revolution of the motor, the effective accuracy of positioning of the loop antenna is well within the one-half degree limit despite inertia of the motor, the associated relays, and the action of the clutch. The friction of the gearing reduces the effect of rotational inertia of the slower moving loop. As will be described in connection with Fig. 2, an electromagnetic brake may also be engaged with the driven member to effect its positioning within even closer tolerances.

When the loop antenna 10 is stopped in the null signal receiving position, reversible motor 20 is also stopped and is thereupon in condition for reactuation by the relay system. A control signal opposite in sense to that which energized relay solenoid 21 will cause relay solenoid 22 to be energized by receiver unit 15. Armature 24 is attracted by energized solenoid 22 against its back contact 46, to connect reversible motor 20 to battery 28 for rotation in the opposite direction to that previously described. Clutch 30 is energized and directly engaged upon motor energization. Loop antenna 10 is motivated in a direction towards the null signal position. The control signal is eliminated when the loop reaches that position, whereupon the loop is promptly arrested at that position in the manner previously described. Whereas in the present example the control signal depends upon the relative position between the loop antenna and the radio transmitter, it is to be understood that the actuation of the relay system for positioning the loop antenna may be independently performed in practicing the invention.

Another feature of the arrangement of the present invention resides in the possibility of direct manual positioning of the loop antenna when the electrical system becomes inoperative. This is particularly important aboard an aircraft when the motor or battery supply goes dead. Due to the normal disengagement of clutch 30 when unenergized, the driven member, in this case loop 10, is normally disengaged from the motor 20. Crank 47, attached to the end of rod 43 extending through indicator 40, is connected with flexible cable 41 and in turn with the rotatable loop assembly through gearing 33, 34. Loop antenna 10 is manually rotatable independently of the motor, through crank 47. When the motor and clutch are not operative or deenergized, the manual control is always available without any conversion.

A modified form of the invention incorporates an electromagnetic brake normally engaged with the driven member, and disengaged therefrom when the member is being operated to a new position by the motor. Fig. 2 diagrammatically illustrates the modified arrangement, components similar to Fig. 1 having like numerals. The illustrated reversible motor 20 has a permanent magnet field 20a and an armature 20b in circuit connection with the relay system through leads 27, 27. Electromagnetic clutch 30, shown in schematic form, couples drive shaft 39 with driven shaft 38. A set of reduction gears 48, 49 is connected between drive shaft 39 and motor shaft 39', this being optional. Clutch 30 comprises magnetic housing 50, a coil 51 connected to the relay system through leads 29, magnetic face plate 52 secured to shaft 39, and face plate 53 splined to driven shaft 38 at 54. Energization of clutch coil 51 causes face plates 52 and 53 to frictionally grip drive shaft 38.

An electromagnetic brake 55 is attached to an extension 56 of shaft 37 in turn coupled to the loop antenna or to any other member to be controllably positioned. The brake proper comprises disk 57 secured to shaft extension 56, and brake shoe 58 arranged on lever 59 pivoted at 60. Lever 59 and shoe 58 are normally mechanically biased towards brake disk 57 by spring 61 attached to fixed projection 62. The brake solenoid 63 is normally connected with the energizing relay and battery circuit through leads 64. A plunger 65 extending from brake shoe 58 is actuated by solenoid 63. Switch 66 is arranged to complete the brake solenoid 63 circuit with the relays when in position with contact 67 as illustrated.

When one of the relay armatures, for example armature 23 as illustrated, is energized by its associated relay solenoid 21 against its back contact 45, reversible motor 20 is energized to rotate in a corresponding direction of rotation, electromagnetic clutch 30 is engaged to drive the shaft 37, and electromagnetic brake 55 is disengaged through energization of its solenoid 63. Solenoid 63 attracts brake shoe 58 against the force of spring 61. When an electrical condition or impulse occurs requiring stopping of the driven member, the main relay solenoid, 21 in this case, is deenergized to return its armature 23 to the normal front contact position and effect deenergization of motor 20, clutch 30 and brake 55. The disengagement of clutch 30 immediately disconnects driven shaft 38 from drive shaft 39. The deenergization of brake 55 causes immediate engagement of brake members 57, 58 to abruptly arrest the rotation of the member shaft 37. The brake accordingly accelerates the stoppage of the controlled member, aiding the frictional forces of the bearings and reduction gearing previously mentioned in connection with Fig. 1.

A similar close and accurate positioning action occurs upon reverse rotational control of the member through energization of the opposite relay solenoid 22, and the corresponding reverse rotation of motor 20. Upon reenergization of the motor, clutch and brake, the brake is disengaged and the clutch reengaged to permit driving of the member to the new position in the manner previously described. When manual operation of the member is required or desired in this modification of the invention, the normally engaged brake 55 is disengaged. One method of brake disengagement is by moving switch arm 66 to contact 68, and energizing brake solenoid 63 through current source 69. Manual disengagement of the brake is also feasible. The member connected to shaft 37, such as a loop antenna, is accordingly readily manually controlled through crank 47, neither brake 55 nor motor 20 being in mechanical engagement therewith.

Although I have specifically described my invention in connection with an automatic radio direction finder, it is to be understood that other uses thereof are feasible. The actuating relays, corresponding to solenoids 21, 22 and their associated armatures 23, 24 may be energized by manual or mechanical controls, and not necessarily automatically such as by the radio directional circuit. The invention is particularly useful where a reasonable control rate of rotation of the member to be controlled is desired, as well as an abrupt accurate stoppage of the member at a given position. The system may for example be used to great advantage to control air valves, such as butterfly valves, in connection with a high pressure aircraft cabin air system. Automatic or manual controls may be used for actuating the motor and solenoid circuits of the system. Modifications falling within the broader spirit and scope of the invention will be apparent to those skilled in the art, and accordingly I do not intend to be limited except as set forth in the following claims.

What I claim is:

1. A system for positioning a rotatable member comprising a reversible electric motor; an electromagnetic clutch having a winding in circuit with said motor, said clutch mechanically coupling said motor with said member and being normally disengaged when deenergized; an electromagnetic brake normally engaged with said member when said brake is deenergized; a source of electric energy for said clutch, brake and motor; means responsive to reversible electric signal conditions for substantially simultaneously energizing said motor and clutch to drive the member in either direction, and disengaging said brake from said member; and means independent of said clutch and motor for energizing said brake into disengagement from said member to permit independent motivation thereof.

2. A system for positioning a rotatable member comprising a reversible electric motor; an electromagnetic clutch coupling said motor with said member; an electromagnetic brake normally engaged with said member; a source of electric energy for said clutch, brake and motor; means responsive to reversible electric signal conditions for substantially simultaneously energizing said motor and clutch to drive the member in either direction at a predetermined rate to a desired angular position and disengaging said brake from said member; means independent of said clutch and motor energizing said brake into disengagement from said member; and manually operable mechanism directly coupled to said member for rotating it independently of said motor and said clutch.

3. A system for positioning a rotatable member comprising a reversible electric motor; an electromagnetic clutch having a winding in circuit with said motor, said clutch mechanically coupling said motor with said member and being normally disengaged when deenergized; an electromagnetic brake normally engaged with said member when said brake is deenergized; a source of electric energy for said clutch, brake and motor; switching means responsive to electric signal conditions for substantially simultaneously energizing said motor and clutch by said source to drive the member in either direction, and disengaging said brake from said member; means independent of said clutch and motor for energizing said brake into disengagement from said member; and manually operable mechanism directly coupled to said member for rotating the member independently of said motor and said clutch when they are disengaged.

WILLIAM P. LEAR.